UNITED STATES PATENT OFFICE.

ARNOLD BERNSTEIN, OF CHEMNITZ, GERMANY.

METHOD OF MANUFACTURING A VISCOSE SOLUTION FROM WOOD-CELLULOSE.

1,121,605.  Specification of Letters Patent.  Patented Dec. 22, 1914.

No Drawing.  Application filed August 22, 1913. Serial No. 786,136.

*To all whom it may concern:*

Be it known that I, Dr. ARNOLD BERNSTEIN, a subject of the German Emperor, and a resident of Chemnitz, in the Kingdom of Saxony, Germany, have invented an Improved Method of Manufacturing a Viscose Solution from Wood-Cellulose, of which the following is a specification.

The object of this invention consists in the production of an improved viscose solution, which is intended for the manufacture of artificial silk, artificial films and similar articles.

The method at present employed, which consists in letting carbon bisulfid act upon alkali-cellulose, entails drawbacks which are overcome by the present invention. The principal drawback consists in the formation of undesirable by-products simultaneously with the intended xanthogenate.

In particular therefore my improved method consists in removing these by-products, before the process of solution is completed and preventing their formation in the complete solution.

To make matters more clear, I shall briefly describe the method now generally employed. The cellulose is first placed in a solution of caustic soda, containing about 18% of sodium hydrate and left there for 2-3 hours; it is then removed from the alkali and squeezed out until the weight of the alkali-cellulose is about 3 to 4 times the former weight of the cellulose. After the alkali cellulose has been left in closed vessels for 2 days, it is treated with carbon bisulfid, whereby the formation of the xanthogenate takes place. This can readily be dissolved in a weak solution of sodium hydrate and then forms the solution of raw viscose.

It has been mentioned already, that the carbon bisulfid does not only produce the xanthogenate, but at same time some undesirable by-products, such as sulfocarbonates, which impair the quality of the final product. This action of the carbon bisulfid is not confined to the process of treating the alkali cellulose with the carbon bisulfid, but it continues in the raw solution of viscose, if the uncombined carbon bisulfid has not been completely removed before.

Various methods have been tried, to obtain a purified viscose solution, free from by-products; as for instance, the precipitation of the xanthogenate by means of salt brine or of alcohol and redissolving the xanthogenate. But the results have not been satisfactory apart from the increase in expense. I have found that a viscose solution of sufficient purity for all practical purposes can be obtained by simply washing the compound, formed by the action of carbon bisulfid on alkali cellulose, with either pure water or slightly acidulated water; provided that the cellulose is derived from wood. In this special case washing with water can be carried out effectually and with satisfactory results.

The manner of proceeding is as follows: The alkali cellulose, made in the manner described, is finely divided by means of a suitable device and transported into a rotary vessel, which may be similar to a butter churn. An appropriate quantity of carbon bisulfid is added, and after the xanthogenate has been formed, the compound is conveyed into a vertical vessel provided with a stirring device and having a conical bottom, which contains a sieve and a stop cock. The vessel is filled with cold water, and the stirring device is put in motion. After a few minutes the stop cock is opened, when a liquid of reddish color will flow out. The cold water used for washing the xanthogenate may contain a slight amount of an organic acid; for instance one half per cent. of acetic acid. This treatment does not merely effect the removal of a considerable part of the by-products from the xanthogenate, but it has the further effect of a complete removal of the uncombined carbon bisulfid, which is condensed by the cold water and flows away with it. In this manner the formation of by-products in the purified viscose solution is prevented. The purified xanthogenate is next conveyed to the dissolving vessel, where a weak solution of sodium hydrate is added and the complete viscose solution is formed. The simple process of washing the xanthogenate with cold water can be used effectually if the cellulose is derived from wood, because in this case no swelling takes place on the addition of water, as would be the case with xanthogenate from other kinds of cellulose, for instance if cotton is used.

The purified viscose solution, made in the manner described, has the advantage that the threads and other products, which are obtained in the precipitating bath, have a greater strength than those made from the raw viscose solution.

What I claim as my invention and desire to secure by Letters Patent is:

1. The method of manufacturing a purified viscose solution from wood cellulose without the previous formation of crude viscose solution, consisting in washing with cold water the compound formed by treating alkali cellulose with carbon bisulfid, and dissolving said compound in a solution of alkali.

2. The method of manufacturing a purified viscose solution from wood cellulose without the previous formation of crude viscose solution, consisting in washing with a cold non-alkaline aqueous liquid the compound formed by treating alkali cellulose with carbon bisulfid, and dissolving said compound in a solution of alkali.

In testimony whereof I affix my signature in presence of two witnesses.

Dr. ARNOLD BERNSTEIN.

Witnesses:
 EMIL STEJER,
 WALTER KOEHLER.